United States Patent Office 3,406,192
Patented Oct. 15, 1968

3,406,192
N-(AROYL) CARBAMATES AND
THIO CARBAMATES
Angelo John Speziale, Creve Coeur, and Lowell R. Smith,
St. Louis, Mo., assignors to Monsanto Company, St.
Louis, Mo., a corporation of Delaware
No Drawing. Original application Sept. 4, 1962, Ser.
No. 221,302. Divided and this application May 13,
1965, Ser. No. 455,632
5 Claims. (Cl. 260—455)

This application is a division of application Ser. No. 221,302, filed Sept. 4, 1962, and now abandoned.

This invention relates to a novel process whereby useful aroyl isocyanates of the formula

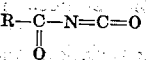

wherein R is phenyl, $C_{1-5}$ alkyl substituted phenyl or chlorine substituted phenyl radicals are made.

The aroyl isocyanates of this invention are prepared by heating under anhydrous conditions to effect evolution of hydrogen chloride a mixture of one mole of an aroylamide of the formula

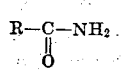

wherein R has the aforedescribed significance and at least one mole of oxalyl chloride in the presence of an inert organic liquid, and thereafter distilling from the reaction mass said aroyl isocyanate.

A wide range of reaction conditions can be employed in preparing these aroyl isocyanates provided the reaction conditions result in the evolution of hydrogen chloride which is a by-product of the reaction. In general it is preferable to reflux the reaction mixture and while refluxing to remove the hydrogen chloride as it forms. Refluxing temperatures in the range of from about 35° C. to about 100° C. have been found highly desirable. With respect to pressure either pressures above or below atmospheric pressure can be employed, however in general it is satisfactory to employ atmospheric pressure.

Although theoretically the amide reactant and oxalyl chloride combine in equimolecular amounts to produce the desired isocyanate it is advantageous to employ an excess of oxalyl chloride, for example up to about two moles per mole of amide.

The inert organic liquid employed in the process of this invention will be a liquid hydrocarbon or a liquid chlorine substituted hydrocarbon or mixtures thereof, e.g. n-pentane, n-hexane, 2-methylpentane, 3-methylpentane, n-heptane, 2-methylhexane, benzene, toluene, xylene, cyclohexane, dichloromethane, 1,1-dichloroethane, 1,2-dichloroethane, chloroform, carbon tetrachloride, isobutyl chloride, chlorobenzene, chlorotoluene, and mixtures thereof. In general it is preferable that the amount of said inert organic liquid present throughout the course of the reaction be that at least sufficient to maintain the aroyl isocyanate produced in solution.

The aroylamide reactants of the method of this invention are of the structure

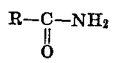

wherein R is phenyl, tolyl, xylyl, ethylphenyl, isopropylphenyl, butylphenyl, amylphenyl, chlorophenyl, dichlorophenyl, trichlorophenyl, and the various isomeric forms thereof. Illustrative of such are benzoylamide, 3-methylbenzoylamide, 4-isopropyl-benzoylamide, 4-chlorobenzoylamide, 3,4-dichlorobenzoylamide, and 2,4,5-trichlorobenzoylamide. Of these reactants the chlorobenzoylamides of the formula

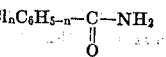

wherein $n$ is a whole number from 1 to 3 upon reacting with oxalyl chloride in accordance with the process of this invention provide isocyanates of the formula

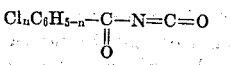

which are particularly useful intermediates in organic synthesis.

The aroyl isocyanates prepared in accordance with the process of this invention are readily hydrolyzed and therefore when stored should be kept free of moisture, as for example stored under refrigerative conditions as such or dissolved in an inert anhydrous organic liquid.

These isocyanates react with a variety of compounds to provide a large number of useful compounds. For example upon reacting in accordance with this invention equimolecular proportions of an aroyl isocyanate (1) and an aliphatic alcohol or aliphatic mercaptan of the formula R'XH where X is sulfur or oxygen and wherein R' is a $C_{1-5}$ aliphatic radical (e.g. methyl, ethyl, isopropyl, amyl, allyl, butenyl, propynyl, 2-chloroethyl, 2,3-dichloropropyl, 2-chloroallyl, 3-chlorobut-2-enyl, etc.) provides esters of the formula

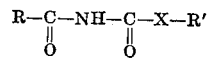

Illustrative of such carbamates and thiolocarbamates are

Methyl N-(3,4-dichlorobenzoyl)carbamate,
Isopropyl N-(3,4-dichlorobenzoyl)carbamate,
Allyl N-(3,4-dichlorobenzoyl)carbamate,
Propynyl N-(3,4-dichlorobenzoyl)carbamate,
2-chloroethyl N-(3,4-dichlorobenzoyl)carbamate,
3-bromopropyl N-(3,4-dichlorobenzoyl)carbamate,
2-(dimethylamino)ethyl N-(3,4-dichlorobenzoyl)
  carbamate,
Methyl N-(3,4-dichlorobenzoyl)thiolocarbamate which materials are herbicidally active.

(2) and a substituted phenol or thiophenol such as the various chlorophenols, chlorothiophenols and nitrophenols provides esters of the formula

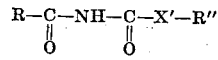

wherein X' is sulfur or oxygen and wherein R" is a phenyl radical having one or more chlorine substituents and/or nitro substituents, which materials, as for example 4-chlorophenyl N-(4-chlorobenzoyl)carbamate and 4-chlorophenyl N - (3,4 - dichlorobenzoyl)carbamate, are herbicidally active (3) and either a secondary heterocyclic amine such as morpholine, hexamethyleneimine, piperidine, etc., or a primary or secondary amine of the formula A—NH—B wherein A is hydrogen or a $C_{1-5}$ aliphatic radical (e.g., methyl, ethyl, isopropyl, amyl, allyl, butenyl, propynyl, 2-chloroethyl, 2,3-dichloropropyl, 2-chloroallyl, 3-chlorobut-2-enyl, etc.) or a phenyl radical or an alkyl substituted phenyl radical or a chlorine substituted phenyl radical and wherein B is a $C_{1-5}$ aliphatic radical (e.g., methyl, ethyl, isopropyl, amyl, allyl, butenyl, propynyl, 2-chloroethyl, 2,3-dichloropropyl, 2-chloroallyl, 3-chlorobut-2-enyl, etc.) or a phenyl radical or an alkyl substituted phenyl radical or a chlorine substituted phenyl radical, provides substituted ureas such as N-(3,4-dichlorobenzoyl)-1-aziridine carboxamide
N-(3,4-dichlorobenzoyl)-4-morpholine carboxamide
N-(3,4-dichlorobenzoyl)-N'-(3,4-dichlorophenyl)urea
N-(3,4-dichlorobenzoyl)-N'-isopropyl-N'-propynyl urea which materials are herbicidally active.

As illustrative of the method of manufacture of the aroyl isocyanates of this invention and the preparation of useful derivatives thereof is the following:

Example I

To a suitable reaction vessel equipped with a thermometer, agitator and reflux condenser is charged at room temperature 12.1 parts by weight of benzoylamide, 13.0 parts by weight of oxalyl chloride and 125 parts by weight of 1,2-dichloroethane. The so charged mass is heated to reflux (about 83° C.) while agitating and then refluxed for 16 hours. Thereafter the resulting mass is subjected to vacuum distillation and the cut (11.0 parts by weight) taken at 97–98° C. at 23 mm. of mercury is benzoyl isocyanate which is identical to an authentic sample of benzoyl isocyanate.

Example II

Employing the procedure of Example I but replacing benzoylamide with an equimolecular amount of 4-isopropylbenzoyl amide there is obtained 4-isopropylbenzoyl isocyanate.

Example III

Employing the procedure of Example I but replacing benzoylamide with an equimolecular amount of 3-methylbenzoylamide there is obtained 3-methylbenzoyl isocyanate.

Example IV

To a suitable reaction vessel equipped with a thermometer, agitator and reflux condenser is charged at room temperature 82.7 parts by weight of 3,4-dichlorobenzoylamide, 64.0 parts by weight of oxalyl chloride and 266 parts by weight of methylene chloride. The so charged mass is then heated to reflux while agitating then refluxed for 18 hours. Thereafter the resulting mass is subjected to vacuum distillation and the cut (91.0 parts by weight) taken at 105.5° C. at 1.6 mm. of mercury is 3,4-dichlorobenzoyl isocyanate which liquid on standing at room temperature solidified to a white solid.

Example IV–A

To a suitable reaction vessel is charged 4.3 parts by weight of 3,4-dichlorobenzoyl isocyanate dissolved in 78 parts by weight of diethylether. While at room temperature and with agitation there is added 2.9 parts by weight of 3,4-dichloroaniline. The precipitate is filtered off and then recrystallized from methanol. The white solid is N - (3,4 - dichlorobenzoyl)-N'-(3,4-dichlorophenyl) urea, M.P. 202.5–203.5° C. This substituted urea is a contact herbicide against broad leaf plants.

Example V

Employing the procedure of Example IV but replacing 3,4-dichlorobenzoylamide with an equimolecular amount of 2,4,5-trichlorobenzoylamide there is obtained 2,4,5-trichlorobenzoyl isocyanate.

The terminus of the reaction is readily determined by observing the cessation of evolution of hydrogen chloride. In the reaction step between the amide and the oxalyl chloride it is desirable that the inert organic liquid employed have a boiling point below that of the desired isocyanate product. In instances wherein a precipitate forms either in the reaction step or during the distillation operation or any time therebetween it is usually desirable to add sufficient inert organic liquid of any of the aforedescribed types to dissolve the precipitated solids. In recovering the isocyanate product it is preferable to conduct the distillation operation under reduced pressure, e.g., at less than 50 mm. of mercury, and which pressure permits of a distillation temperature of not more than 125° C.

While this invention has been described with respect to certain embodiments it is to be understood that it is not so limited and that variations and modifications thereof obvious to those skilled in the art can be made without departing from the spirit or scope of this invention.

What is claimed is:

1. An N-(aroyl)carbamate of the formula

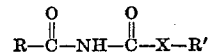

wherein R is chloro substituted phenyl having from 1 to 3 chlorine substituents, wherein X is a chalkogen of atomic weight less than 40, and wherein R' has from 1 to 5 carbon atoms and is selected from the group consisting of alkyl, alkenyl, alkynyl, chloroalkyl and chloroalkenyl.

2. An N-(chlorobenzoyl)carbamate of the formula

wherein R is chloro substituted phenyl having from 1 to 3 chlorine substituents and wherein R' is alkyl having from 1 to 5 carbon atoms.

3. Methyl N-(3,4-dichlorobenzoyl)carbamate.
4. Methyl N-(3,4-dichlorobenzoyl)thiocarbamate.
5. Isopropyl N-(3,4-dichlorobenzoyl)carbamate.

References Cited

UNITED STATES PATENTS 3,129,246   4/1964   Harris et al. _____ 260—552

OTHER REFERENCES

Sheehan et al.: J.A.C.S., pp. 4059–62, vol. 71 (December 1949).

Beilstein: "Beilstein's Handbuch der Org. Chemie," 4th series, vol. 9, p. 105 (1923), QD 251, B4 1918.

Elmore et al.: "J. Chem. Soc." (1956), pp. 4458 and 4462.

CHARLES B. PARKER, Primary Examiner.

D. R. PHILLIPS, Assistant Examiner.